(12) United States Patent
Hattori et al.

(10) Patent No.: US 10,443,677 B2
(45) Date of Patent: Oct. 15, 2019

(54) BASE ISOLATION UNIT AND BASE ISOLATION APPARATUS

(71) Applicant: Mitsubishi Electric Corporation, Chiyoda-ku (JP)

(72) Inventors: Tomoya Hattori, Chiyoda-ku (JP); Noboru Kawaguchi, Chiyoda-ku (JP); Junji Takaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/763,256

(22) PCT Filed: Sep. 30, 2015

(86) PCT No.: PCT/JP2015/077838
§ 371 (c)(1),
(2) Date: Mar. 26, 2018

(87) PCT Pub. No.: WO2017/056265
PCT Pub. Date: Apr. 6, 2017

(65) Prior Publication Data
US 2018/0283487 A1    Oct. 4, 2018

(51) Int. Cl.
*F16M 11/22*     (2006.01)
*F16F 15/02*     (2006.01)
(Continued)

(52) U.S. Cl.
CPC ............. *F16F 15/022* (2013.01); *E04B 1/98* (2013.01); *E04H 9/02* (2013.01); *F16F 1/32* (2013.01);
(Continued)

(58) Field of Classification Search
USPC ....................................................... 248/562
See application file for complete search history.

(56) References Cited

U.S. PATENT DOCUMENTS 4,883,250 A * 11/1989 Yano ....................... E04H 9/023
                                                          248/638
5,178,357 A    1/1993 Platus
(Continued)

FOREIGN PATENT DOCUMENTS

JP   61-116142 A    6/1986
JP   61-191544 U   11/1986
(Continued)

OTHER PUBLICATIONS

Office Action drafted Sep. 15, 2017 in Japanese application No. 2017-527393 (with English translation).
(Continued)

*Primary Examiner* — Monica E Millner
(74) *Attorney, Agent, or Firm* — Oblon, McClelland, Maier & Neustadt, L.L.P.

(57) ABSTRACT

A base isolation unit includes a vibration-source connector to be connected with a structure subjected to seismic vibration, an isolated-object connector to be connected with an object to be isolated from vibration, and located at a predetermined distance from the vibration-source connector in a predetermined base isolation direction, and a movement regulator. The movement regulator is located between the vibration-source connector and the isolated-object connector and includes an elastic body applied with a preload and subjected to a pressure caused by an external force in the base isolation direction. The movement regulator keeps the distance unchanged when the external force is equal to or less the preload, and changes the distance by making the vibration-source connector movable when the external force exceeds the preload. The base isolation unit is usable repeatedly and in environments without electricity, and achieving isolation from seismic vibration while keeping stiffness in conditions other than earthquakes.

14 Claims, 13 Drawing Sheets

(51) Int. Cl.
| | |
|---|---|
| *E04H 9/02* | (2006.01) |
| *F16F 15/04* | (2006.01) |
| *F16F 1/32* | (2006.01) |
| *F16F 7/00* | (2006.01) |
| *E04B 1/98* | (2006.01) |
| *F16F 3/02* | (2006.01) |
| *F16F 13/00* | (2006.01) |
| *F16F 15/06* | (2006.01) |
| *G02B 23/16* | (2006.01) |

(52) U.S. Cl.
CPC .................. *F16F 3/02* (2013.01); *F16F 7/00* (2013.01); *F16F 13/00* (2013.01); *F16F 15/04* (2013.01); *F16F 15/06* (2013.01); *F16M 11/22* (2013.01); *G02B 23/16* (2013.01); *F16F 2230/0023* (2013.01); *F16M 2200/08* (2013.01)

(56) References Cited

U.S. PATENT DOCUMENTS

| | | | | |
|---|---|---|---|---|
| 5,390,892 | A | | 2/1995 | Platus |
| 5,689,919 | A | * | 11/1997 | Yano ........................ E04H 9/023 248/550 |
| 5,975,510 | A | * | 11/1999 | Miyazaki ................ F16F 1/371 248/550 |
| 6,966,154 | B1 | * | 11/2005 | Bierwirth ................ E02D 27/34 52/167.4 |
| 7,540,117 | B2 | * | 6/2009 | Yang ........................ E04H 9/021 52/167.1 |
| 7,726,452 | B2 | * | 6/2010 | Kraner .................. F16F 15/027 188/378 |
| 7,886,489 | B2 | * | 2/2011 | Tubota .................. F16F 15/021 52/167.4 |
| 8,429,862 | B2 | * | 4/2013 | Yin ......................... E04B 1/985 52/167.4 |
| 8,671,629 | B2 | * | 3/2014 | Wu ............................ E04H 9/02 52/1 |
| 2006/0086582 | A1 | * | 4/2006 | Spyche, Jr. ............... E04H 9/02 188/378 |
| 2006/0225977 | A1 | | 10/2006 | Melz et al. |
| 2010/0109219 | A1 | | 5/2010 | Melz et al. |

FOREIGN PATENT DOCUMENTS

| | | |
|---|---|---|
| JP | 62-063776 A | 3/1987 |
| JP | 9-217785 A | 8/1997 |
| JP | 11-200659 A | 7/1999 |
| JP | 2009-236268 A | 10/2009 |
| JP | 2013-104438 A | 5/2013 |
| WO | 92/21912 A1 | 12/1992 |
| WO | 2005/010399 A1 | 2/2005 |

OTHER PUBLICATIONS

International Search Report dated Dec. 22, 2015 in PCT/JP2015/077838, filed on Sep. 30, 2015.
Extended European Search Report dated Oct. 16, 2018 in European Patent Application No. 15905419.6.

* cited by examiner

FIG.3
(A)
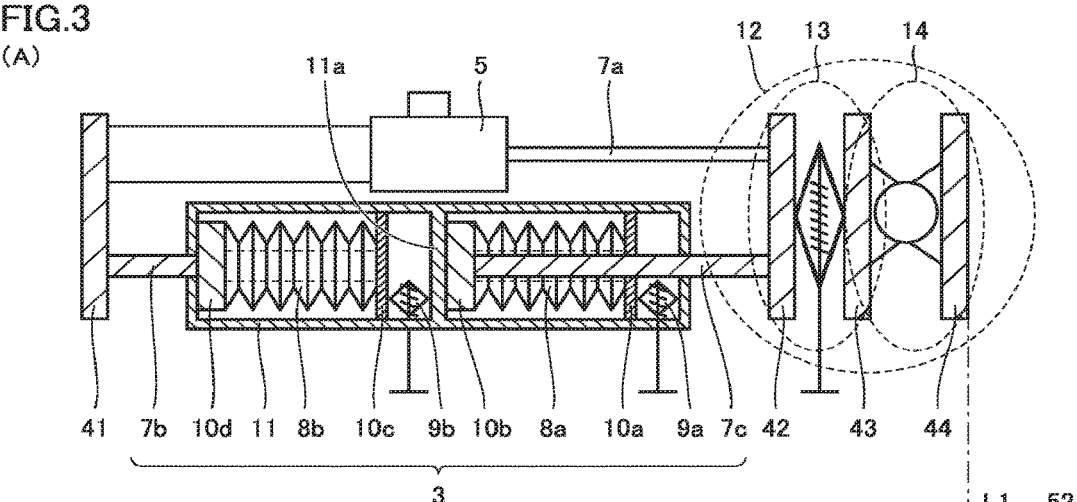
(B)
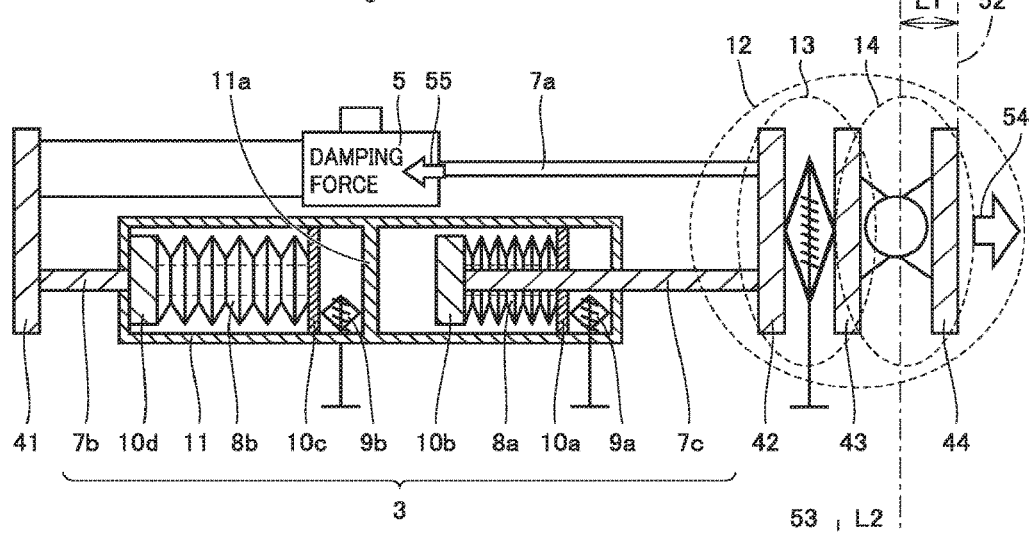
(C)
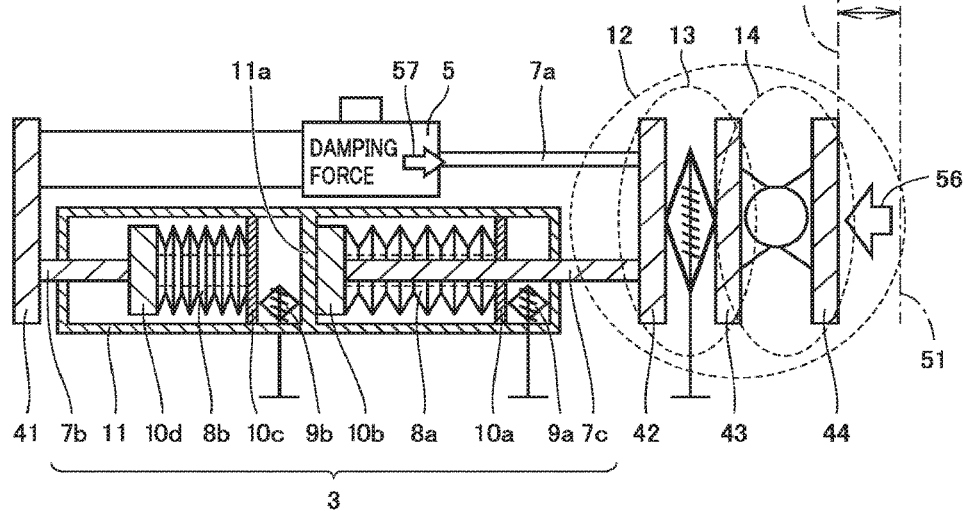

BASE ISOLATION UNIT AND BASE ISOLATION APPARATUS

TECHNICAL FIELD

The present disclosure relates to a base isolation unit and a base isolation apparatus for preventing transmission of seismic vibration to structures and/or instruments.

BACKGROUND ART

A base isolation unit or a base isolation apparatus is installed between a base and an object to be isolated from vibration for isolating the object from the base when an earthquake occurs. Resultant effects are prevention of transmission of seismic vibration from the base to the object to be isolated, and mitigation of an acceleration applied to the object when an earthquake occurs. Specifically, a base isolation apparatus including a supporting apparatus and a damping apparatus is mounted between the base and the object to be isolated (see Patent Document 1, for example). Patent Document 1 suggests applicability of a spring apparatus to the base isolation apparatus.

Conventional base isolation apparatuses intended to function only when an earthquake occurs may also function when an object to be isolated is subjected to an external force due to wind for example.

In order to inhibit the base isolating operation in conditions other than earthquakes, there is a need for a base isolation apparatus that can fix the base and the object to be isolated with high stiffness in conditions other than earthquakes. If the spring apparatus disclosed in Patent Document 1 for example is applied to the base isolation apparatus, the spring apparatus works as an ordinary spring, and does not have a triggering function causing the base isolation apparatus to work only when an earthquake occurs.

In order to satisfy the aforementioned need, attempts have been made to perform the triggering function using elastic stiffness of a plastic damping apparatus used for base isolation, to use a mechanical element broken when a large earthquake occurs to release connection between the base and the object to be isolated, or to apply a mechanism for activating the base isolating function using a seismic wave observation sensor, to thereby release, only when an earthquake occurs, connection made by fixtures between the base and the object to be isolated (see Patent Document 2, for example).

CITATION LIST

Patent Document

Patent Document 1: Japanese Patent Laying-Open No. 2013-104438
Patent Document 2: Japanese Patent Laying-Open No. 62-063776

SUMMARY OF INVENTION

Technical Problem

The conventional base isolation apparatuses have a problem that they are not reusable for repeatedly occurring earthquakes, or that they cannot be used during power failure due to the necessity for a power source for the base isolation apparatuses to operate.

The conventional base isolation apparatuses do not fulfill the need to prevent vertical seismic vibration from being transmitted to an object to be isolated, while supporting the weight of the object.

In order to install the base isolation apparatus in a manner to isolate vertical vibration, a vertically upward force and a vertically downward force that trigger the base isolating function should be different in magnitude from each other, because there is an influence of the weight of the object due to gravity. The spring apparatus disclosed in Patent Document 1 uses a single spring held in a single casing, which means that different magnitudes of the triggering force for different directions are difficult to achieve.

The present disclosure is provided to solve the problems, and an object of the present disclosure is to provide a base isolation unit and a base isolation apparatus usable repeatedly and in environments without electricity and achieving isolation from seismic vibration while keeping stiffness in conditions other than earthquakes.

Solution to Problem

A base isolation unit according to an aspect of the present disclosure includes: a vibration-source connector to be connected with a structure subjected to seismic vibration; an isolated-object connector to be connected with an object to be isolated from vibration, the isolated-object connector being located at a predetermined distance from the vibration-source connector in a predetermined base isolation direction; and a movement regulator. The movement regulator is located between the vibration-source connector and the isolated-object connector, and includes an elastic body. The elastic body is applied with a preload and is subjected to a pressure caused by an external force in the base isolation direction. The movement regulator keeps the distance unchanged when the external force is equal to or less than the preload, and changes the distance by making the vibration-source connector movable when the external force is larger than the preload.

A base isolation apparatus according to an aspect of the present disclosure includes a vertical base isolation unit, a first-direction base isolation unit, and a second-direction base isolation unit. The vertical base isolation unit isolates the object located above the vertical base isolation unit from vibration in vertical direction, the vertical direction being the base isolation direction of the vertical base isolation unit. The first-direction base isolation unit is a base isolation unit to be connected with the object through the vertical base isolation unit, and the first-direction base isolation unit isolates the object from vibration in a first direction in a horizontal plane, the first direction being the base isolation direction of the first-direction base isolation unit. The second-direction base isolation unit is a base isolation unit to be connected with the object through the vertical base isolation unit, and the second-direction base isolation unit isolates the object from vibration in a second direction different from the first direction in the horizontal plane, the second direction being the base isolation direction of the second-direction base isolation unit. The movement regulator of the vertical base isolation unit includes: a tensile-side elastic body subjected to a pressure caused by the external force in a direction of increasing the distance; and a compressive-side elastic body subjected to a pressure caused by the external force in a direction of decreasing the distance. The vertical base isolation unit includes: a tensile-side preload adjuster to change the preload applied to the tensile-side elastic body; and a compressive-side preload adjuster to change the preload applied to the compressive-side elastic body. The preload of the compressive-side elastic body included in the vertical base isolation unit is larger than a force in gravity direction for supporting gravity acting on the object to be isolated.

A base isolation apparatus according to an aspect of the present disclosure includes: a first-direction base isolation unit being a base isolation unit to be connected with the object supported movably in a horizontal plane, to isolate the object from vibration in a first direction in the horizontal plane, the first direction being the base isolation direction of the first-direction base isolation unit; and a second-direction base isolation unit being a base isolation unit to be connected with the object, to isolate the object from vibration in a second direction different from the first direction in the horizontal plane, the second direction being the base isolation direction of the second-direction base isolation unit.

Advantageous Effects of Invention

According to the present disclosure, a base isolation unit and a base isolation apparatus are provided that are usable repeatedly and in environments without electricity, and achieve isolation from seismic vibration while keeping stiffness in conditions other than earthquakes.

BRIEF DESCRIPTION OF DRAWINGS

FIG. 3 is a schematic diagram for illustrating an operation of the base isolation unit shown in FIG. 1.

DESCRIPTION OF EMBODIMENTS

Figure 1:
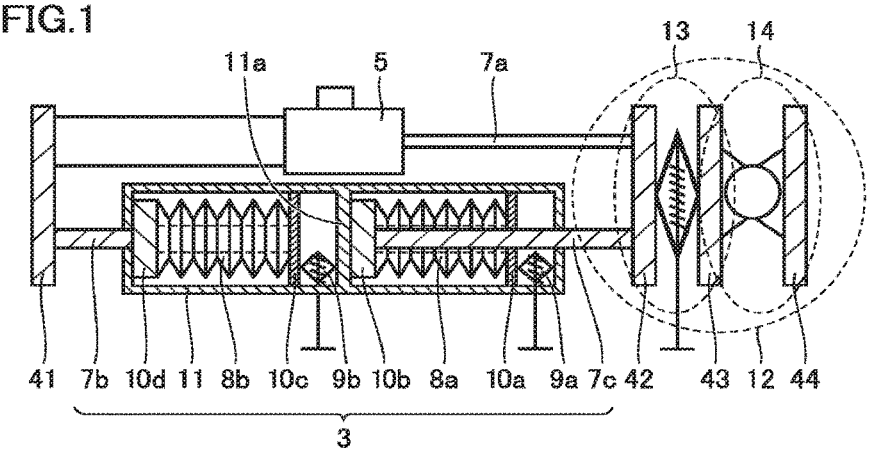
FIG. 1 is a schematic diagram of a base isolation unit according to a first embodiment of the present disclosure.

Embodiments of the present disclosure are described below with reference to the drawings. In the following drawings, the same or corresponding parts are denoted by the same reference numerals, and a description thereof is not repeated.

First Embodiment

<Configuration of Base Isolation Unit>

Referring to FIG. 1, a base isolation unit according to a first embodiment of the present disclosure is described.

The base isolation unit mainly includes: a first connector 41 being an isolated-object connector to be connected with an object to be isolated from vibration; a second connector 12 being a vibration-source connector to be connected with a structure subjected to seismic vibration; a preloaded spring unit 3 being a movement regulator enabling second connector 12 to move and thereby change the distance between first connector 41 and second connector 12 when subjected to an external force higher than a threshold value; and a damper 5. Between first connector 41 and second connector 12, preloaded spring unit 3 and damper 5 in a predetermined base isolation direction are arranged in parallel with each other. The direction of stretching or compressing preloaded spring unit 3 and damper 5 is referred to herein as main-axis direction. In the state where the base isolation unit is installed for base isolation, the main-axis direction is the same as the base isolation direction.

Preloaded spring unit 3 mainly includes two springs to which a preload is applied (referred to as preloaded springs 8a, 8b hereinafter), preload-force adjusting mechanisms 9a, 9b to adjust the preload applied to preloaded springs 8a, 8b, a casing 11 to house preloaded springs 8a, 8b separately from each other, and shafts 7b, 7c to transmit an external force to preloaded springs 8a, 8b, respectively. Casing 11 has a cylindrical shape in which two internal spaces are separated from each other by a partition wall 11a. Each of the both end faces interposing partition wall 11a therebetween has an opening through which associated shaft 7b, 7c extends. Shaft 7b connects with first connector 41. Shaft 7c connects with second connector 12. In the two internal spaces, respective preloaded springs 8a, 8b are disposed. Preloaded springs 8a, 8b are each made up of a stack of a predetermined number of disc springs each having an external shape of a frustum. The disc spring has a circular hole in its top. Preloaded springs 8a, 8b are loaded in advance in the main-axis direction and thereby compressed relative to their unloaded state having a natural length.

Preloaded spring unit 3 may be regarded as having two casings and two spaces in these respective casings. The openings of casing 11 are each sized to pass associated shaft 7b, 7c but do not allow associated preloaded spring 8a, 8b to get out of casing 11.

Shaft 7c has one end connected with a plate-like pressurizing member 10b located between partition wall 11a and preloaded spring 8a. Shaft 7c and pressurizing member 10b are not movable toward partition wall 11a but are movable in the direction to the side where preloaded spring 8a exists. As shaft 7c and pressurizing member 10b move to compress further preloaded spring 8a, the length of preloaded spring unit 3 increases. When an external force (tensile force) to increase the distance between first connector 41 and second connector 12 is applied in the base isolation direction to preloaded spring unit 3, the external force is applied as a pressure to preloaded spring 8a. Preloaded spring 8a is an elastic body (tensile-side elastic body) subjected to a pressure caused by an external force in the direction of increasing the distance. Shaft 7c is a tensile-side shaft to transmit the external force to pressurizing member 10b. Pressurizing member 10*b* is a tensile-force applicator connected with the tensile-side shaft and to transmit the force as a pressure from the tensile-side shaft to the tensile-side elastic body.

Shaft 7*b* has one end connected with a plate-like pressurizing member 10*d* located between preloaded spring 8*b* and the end portion of casing 11 having the opening. Shaft 7*b* and pressurizing member 10*d* are not movable toward this end portion of casing 11 but are movable in the direction to the side where preloaded spring 8*b* exists. As shaft 7*b* and pressurizing member 10*d* move to compress further preloaded spring 8*b*, the length of preloaded spring unit 3 decreases. When an external force (compressive force) in the direction of decreasing the distance between first connector 41 and second connector 12 is applied in the base isolation direction to preloaded spring unit 3, the external force is applied as a pressure to preloaded spring 8*b*. Preloaded spring 8*b* is an elastic body (compressive-side elastic body) subjected to a pressure caused by an external force to decrease the distance. Shaft 7*b* is a compressive-side shaft to transmit the external force to pressurizing member 10*d*. Pressurizing member 10*d* is a compressive-force applicator connected with the compressive-side shaft and to transmit the force as a pressure from the compressive-side shaft to the compressive-side elastic body. The side in which the pressurizing member being in contact with the associated spring is located on a side far from the associated opening of the casing is the tensile side, and the side in which the pressurizing member being in contact with the associated spring is located on a side near the associated opening of the casing is the compressive side.

When the tensile force is applied to preloaded spring unit 3, pressurizing member 10*d* and the end portion of casing 11 press each other and the tensile force is not transmitted to preloaded spring 8*b*. When the compressive force is applied to preloaded spring unit 3, pressurizing member 10*b* and partition wall 11*a* press each other and the compressive force is not transmitted to preloaded spring 8*a*.

In other words, casing 11 includes a tensile-side casing including partition wall 11*a* and extending from partition wall 11*a* toward second connector 12, and the tensile-side casing houses preloaded spring 8*a* being a tensile-side elastic body and has an opening in its end face on a side where second connector 12 exists in the base isolation direction. Casing 11 also includes a compressive-side casing including partition wall 11*a* and extending from partition wall 11*a* toward first connector 41, and the compressive-side casing houses preloaded spring 8*b* being a compressive-side elastic body and has an opening in its end face on a side where first connector 41 exists and the tensile-side casing does not exist in the base isolation direction. In the first embodiment, the tensile-side casing and the compressive-side casing form a single casing and share the partition wall separating the tensile-side and compressive-side casings from each other. The tensile-side casing and the compressive-side casing may be separate casings having an invariable positional relation therebetween.

Preloaded spring 8*b* has an end portion in contact with pressurizing member 10*d* and an opposite end portion in contact with a movable plate 10*c*. Movable plate 10*c* is adjustable positionally by preload-force adjusting mechanism 9*b* as described later herein.

Preloaded spring 8*a* has an end portion in contact with pressurizing member 10*b* and an opposite end portion in contact with a movable plate 10*a*. Movable plate 10*a* is also adjustable positionally by preload-force adjusting mechanism 9*a* described later herein. Two preloaded springs 8*a*, 8*b* arranged to be compressed by an external force are located in casing 11, and preloaded spring unit 3 is therefore a stretchable and compressive unit.

Preload-force adjusting mechanisms 9*a*, 9*b* each being a preload adjuster are mechanisms to move associated movable plates 10*a*, 10*c* and thereby adjusting the preload applied to preloaded springs 8*a*, 8*b*. As movable plate 10*a*, 10*c* moves, the distance between the inner end face of casing 11 and movable plate 10*a*, 10*c* changes and thus the length of spring 8*a*, 8*b* changes. The length of spring 8*a*, 8*b* has a linear relation with the magnitude of the applied force, based on the Hooke's law. As movable plate 10*a*, 10*b* is moved, the preload applied to preloaded spring 8*a*, 8*b* therefore changes. Preload-force adjusting mechanisms 9*a*, 9*b* may be configured in any manner as long as they can move movable plates 10*a*, 10*c*. A jack or screw for example may be used as the preload-force adjusting mechanism. In this way, the preload for starting work of the base isolation system can be changed after installation of the base isolation system. Specifically, the preload may have a value reasonably larger than an external force applied in a normal state to the object to be isolated, such as a load due to wind, for example. The preload may for example be approximately twice as large as a supposed maximum value of the external force applied in a normal state. Preload-force adjusting mechanism 9*a* is a tensile-side preload adjuster to change the preload applied to preloaded spring 8*a* being the tensile-side elastic body. Preload-force adjusting mechanism 9*b* is a compressive-side preload adjuster to change the preload applied to preloaded spring 8*b* being the compressive-side elastic body.

Damper 5 being a vibration damper generates a resistive force depending on the moving speed to dampen applied vibration. Specifically, as the distance between first connector 41 and second connector 12 increases, damper 5 generates a force in the direction of decreasing the distance and, as the distance decreases, damper 5 generates a force in the direction of increasing the distance. Damper 5 has one end connected with first connector 41. Damper 5 has the other end existing at the opposite side to the one end connected with first connector 41, and a shaft 7*a* of damper 5 extends from the other end. Shaft 7*a* has an end connected with a supporting part 42 of second connector 12. Any known damper may be used as damper 5. Damper 5 may be disposed in a manner to connect the end of shaft 7*a* with first connector 41.

If damper 5 is not provided, ideal base isolation is achieved. In this case, the acceleration applied to the object to be isolated can be made smaller than the acceleration applied to the object when damper 5 is provided. The variation in distance from the structure shaken together with the ground to the object to be isolated, however, may be greater to reach several meters. Damper 5 is provided for preventing this large variation.

The smaller the damping action of damper 5, the lower the acceleration applied to the object to be isolated. Meanwhile, the variation in distance between the structure and the object to be isolated increases. The larger the damping action of damper 5, the smaller the variation in distance between the structure and the object to be isolated. Meanwhile, the acceleration applied to the object to be isolated increases. In consideration of the trade-off between the variation in distance and the acceleration, the damping characteristic of damper 5 is determined in a manner to set the variation in distance to a realistic value (30 cm or less, for example) and minimize the acceleration applied to the object to be isolated as much as possible, if not perfect base isolation.

Second connector 12 being the vibration-source connector is connected with the structure subjected to seismic vibration, and also has functions of positional and rotational displacement adjusting mechanism. Second connector 12 includes a positional displacement adjusting mechanism 13 and a rotational displacement adjusting mechanism 14. Positional displacement adjusting mechanism 13 includes supporting part 42 in the form of a plate member, an intermediate plate 43 in the form of a plate member disposed at a distance from supporting part 42, and a distance adjusting member to change the distance between supporting part 42 and intermediate plate 43. The distance adjusting member can change the distance between supporting part 42 and intermediate plate 43. The distance adjusting member is a jack or screw, for example.

Rotational displacement adjusting mechanism 14 includes intermediate plate 43, a connector 44 disposed at a distance from intermediate plate 43, and a spherical bearing connecting intermediate plate 43 with connector 44 at a given angle. When the base isolation unit is installed, such a second connector 12 can be used to make appropriate positional adjustments to connector 44 with respect to the structure at six degrees of freedom, for example. A counterforce resultant from restricting, by connector 44, the object to be isolated can be prevented from influencing objects such as precision instruments with weak stiffness that are housed in the object to be isolated. Rotational displacement adjusting mechanism 14 may be disposed on a side where preloaded spring unit 3 exists.

Positional displacement adjusting mechanism 13 and rotational displacement adjusting mechanism 14 may be placed in first connector 41 or in both first connector 41 and second connector 12. Specifically, at least one of first connector 41 and second connector 12 of the base isolation unit includes connector 44 being a connection member to be in contact and connected with an object, a distance adjusting member and a member to change a connection angle such as spherical bearing. The distance adjusting member and the member to change a connection angle operate as a connection position adjuster capable of adjusting the position and the angle of connector 44 with respect to preloaded spring unit 3 being the movement regulator.

<Example Configuration Where Base Isolation Unit is Applied>

Figure 2:
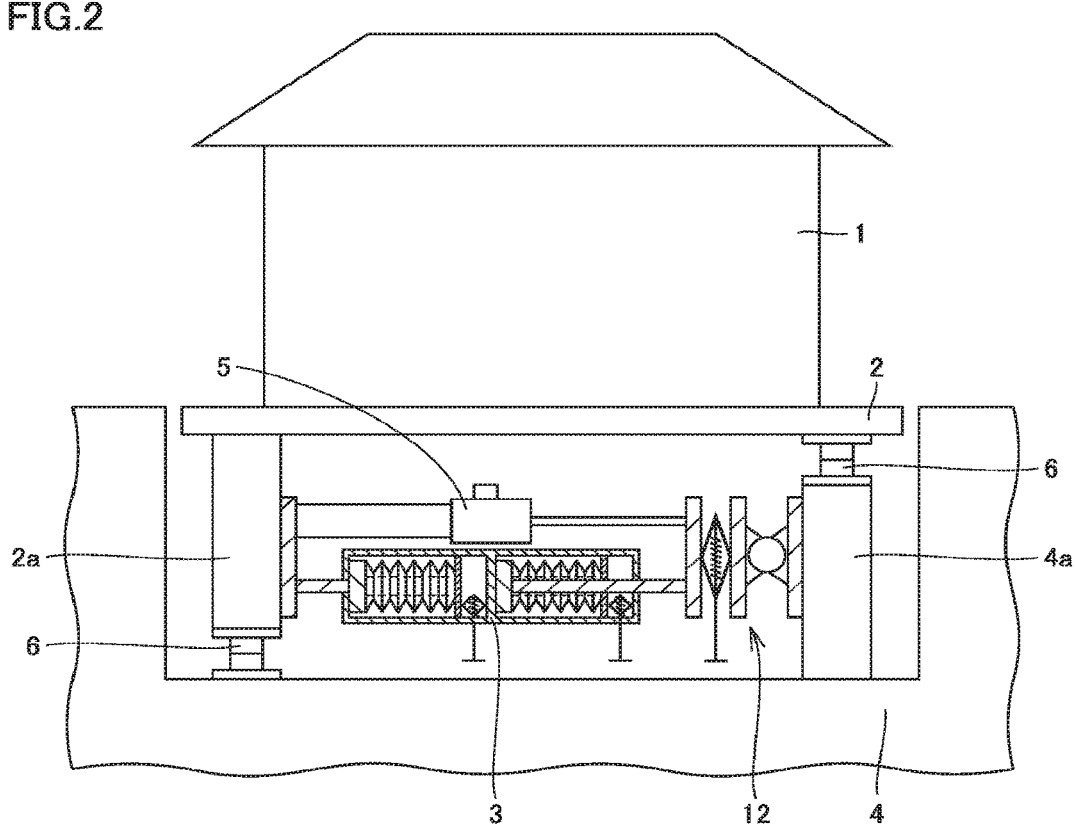
FIG. 2 is a schematic diagram showing an example configuration where a base isolation apparatus including the base isolation unit shown in FIG. 1 is applied to a base under an object to be isolated.

Referring to FIG. 2, a description is given of an example application of the base isolation unit shown in FIG. 1. FIG. 2 shows the example configuration where the base isolation unit shown in FIG. 1 is installed in one horizontal direction. FIG. 2 shows the base isolation unit installed in one horizontal direction referred to herein as first direction. In this example configuration, however, another base isolation unit (not shown) is also installed in a direction, referred to herein as second direction, crossing the first direction in a horizontal plane. Preferably, the second direction is perpendicular to the first direction in the horizontal plane. A base isolation apparatus having the example configuration shown in FIG. 2 thus includes: a first-direction base isolation unit to be connected with object 1 supported movably in the horizontal plane, to isolate object 1 from vibration in the first direction in the horizontal plane; and a second-direction base isolation unit to be connected with object 1 to isolate object 1 from vibration in the second direction different from the first direction in the horizontal plane. The first-direction and second-direction base isolation units are each identical to the base isolation unit shown in FIG. 1. In such a base isolation apparatus, two or more base isolation units may be installed in at least one of the first direction and the second direction. In this case, a plurality of base isolation units may be arranged so that one or more base isolation units are located on each of both sides of the object to be isolated. The number of base isolation units can be increased to achieve a greater base isolation effect.

As shown in FIG. 2, the base isolation unit is installed between a layer 2 to be isolated and a base 4 under the ground. Layer 2 is a horizontal plate disposed under object 1 to be isolated such as building or precision instrument. Object 1 to be isolated is located on layer 2 to be isolated. The base isolation unit in FIG. 2 is drawn larger than its actual size. Layer 2 to be isolated has an end portion where the base isolation unit is installed, and a wall 4a extends from base 4 toward the end portion of layer 2 to be isolated. A wall 2a extends from layer 2 to be isolated toward base 4 at the position facing wall 4a. The base isolation unit is disposed to couple wall 2a and wall 4a facing each other.

A linear guide 6 is disposed between wall 2a and base 4. Linear guide 6 is a guide mechanism to move smoothly without being restricted horizontally. A linear guide 6 is also disposed between wall 4a and layer 2 to be isolated. A sliding support may be used instead of the linear guide. Laminated rubber, sliding bearing, or rolling bearing, for example, may be used instead of the linear guide.

In the case of the horizontal base isolation as shown in FIG. 2, the weight of object 1 and layer 2 to be isolated is supported by wall 2a and wall 4a through horizontal linear guide 6. When earthquake occurs to vibrate base 4, the base isolation unit having this configuration mitigates vibration of object 1 and layer 2 to be isolated. Accordingly, layer 2 and object 1 to be isolated are decoupled from horizontal seismic vibration.

<Operation of Base Isolation Unit>

Figure 4:
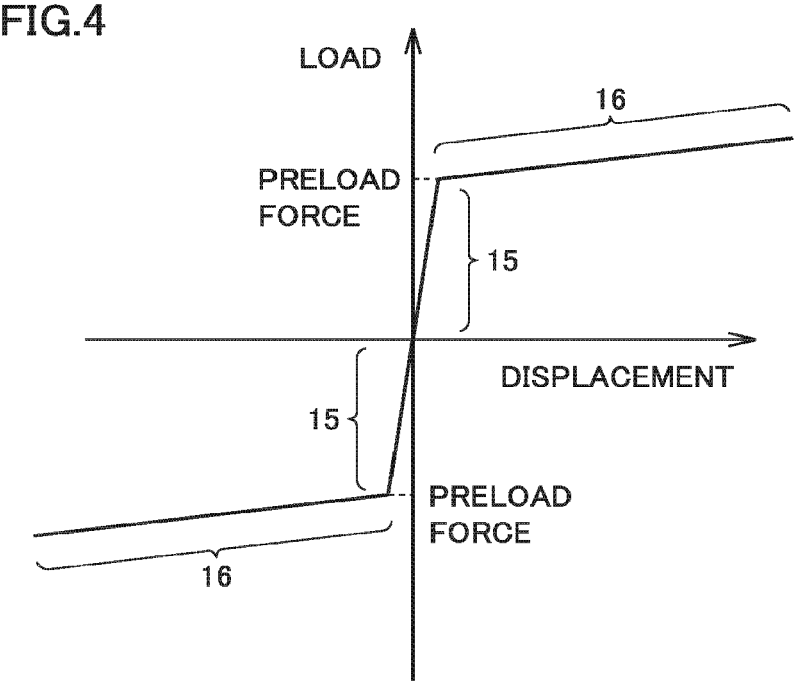
FIG. 4 is a graph for illustrating characteristics of a preloaded spring unit used for the base isolation unit shown in FIG. 1.

Referring to FIGS. 3 and 4, a description is given of an operation of the base isolation unit according to the present embodiment. FIG. 3 (A) shows the base isolation unit in a normal state before seismic vibration is applied. FIG. 3 (B) shows a state where an external tensile force indicated by an arrow 54 is applied in the base isolation direction to the base isolation unit. FIG. 3 (C) shows a state where an external compressive force indicated by an arrow 56 is applied in the base isolation direction to the base isolation unit.

As shown in FIG. 3 (B), when an external tensile force is applied to the base isolation unit, pressurizing member 10b connected with shaft 7c presses preloaded spring 8a. Preloaded spring 8a to which a preload is applied is compressively deformed further when the external force exceeds the preload. Accordingly, as shown in FIG. 3 (B), the distance from pressurizing member 10b to movable plate 10a decreases and second connector 12 moves outward by a distance L1 relative to the normal state shown in FIG. 3 (A). Distance L1 is the distance from the position of connector 44 in the normal state indicated by a line segment 51 to the position of connector 44 indicated by a line segment 52 in FIG. 3 (B). As second connector 12 moves relative to first connector 41, shaft 7a of damper 5 also moves toward second connector 12, and a damping force against the movement as indicated by an arrow 55 is generated at damper 5.

As shown in FIG. 3 (C), when an external compressive force is applied to the base isolation unit, shaft 7c presses partition wall 11a toward second connector 41. Pressed partition wall 11a presses spring 8b through movable plate 10c. Second connector 41, shaft 7b, and pressurizing member 10d remain stationary. Pressurizing member 10d connected with shaft 7b thus presses preloaded spring 8b. Preloaded spring 8b to which a preload is applied is compressively deformed further when the external force exceeds the preload. Accordingly, as shown in FIG. 3 (C), the distance from pressurizing member 10d associated with first connector 41 to movable plate 10c decreases and second connector 12 moves inward by a distance L2 relative to the normal state shown in FIG. 3 (A). Distance L2 is the distance from the position of connector 44 in the normal state indicated by line segment 51 to the position of connector 44 indicated by a line segment 53 in FIG. 3 (C). As second connector 12 moves toward first connector 41, shaft 7a of damper 5 also moves toward first connector 41, and a damping force against the movement as indicated by an arrow 57 is generated at damper 5.

When an external seismic force exceeding the preload of preloaded spring 8a, 8b is applied to the base isolation unit, preloaded spring 8a, 8b is compressed to decouple base 4 from object 1 and thereby isolate object 1 from vibration. At the same time, damper 5 dampens the applied seismic vibration. The base isolation unit thus prevents transmission of the vibration from base 4 to layer 2 to be isolated.

After the earthquake, the resilience of preloaded spring 8a, 8b returns pressurizing member 10b, 10d to the initial position before the earthquake. The base isolation unit thus returns to its normal state automatically to be ready to operate similarly for the next earthquake. When an external force equal to or less than the preload is applied to the base isolation unit, the distance between first connector 41 and second connector 12 does not change and the base isolation unit couples object 1 with base 4 with high stiffness maintained.

It is desirable to design preloaded springs 8a, 8b with a low spring constant so as not to influence the base isolation function. Specifically, the elastic modulus of preloaded spring unit 3 preferably changes as shown in FIG. 4.

FIG. 4 is a graph showing a relation between the load and the displacement of preloaded spring unit 3. In FIG. 4, the horizontal axis represents the displacement of the distance between first connector 41 and second connector 12 of preloaded spring unit 3, and the vertical axis represents the load applied to preloaded spring unit 3. The upper side of the vertical axis represents tensile load, and the lower side of the vertical axis represents compressive load. The displacement of the distance between first connector 41 and the second connector 12 in the normal state is zero. As shown in FIG. 4, preloaded springs 8a, 8b with a low spring constant to which a preload is applied are used for preloaded spring unit 3 in the present embodiment. Accordingly, when the load is smaller than a predetermined preload force as indicated by regions 15 in FIG. 4, the stiffness of casing 11 is predominant and the increase/decrease of the displacement in response to the change of the load is extremely small. In contrast, when the load is larger than the predetermined preload force as indicated by regions 16 in FIG. 4, the spring constant of preloaded springs 8a, 8b is predominant and the increase/decrease of the displacement in response to the change of the load is relatively larger. When the increase/decrease of the displacement in response to the change of the load is smaller than a predetermined threshold, the displacement of the distance between first connector 41 and second connector 12 is identified herein as zero.

As the stroke of preloaded springs 8a, 8b is larger, the lesser the influence of the spring stiffness when an earthquake occurs and the base isolation performance can be enhanced. The need, however, arises for preloaded springs 8a, 8b with a longer stroke and accordingly a larger-sized base isolation unit. The configuration of the base isolation unit is therefore determined comprehensively in view of the requirement for the seismic acceleration applied to the object to be isolated, the cost of the base isolation unit, and spatial restriction, for example.

<Advantages of Base Isolation Unit>

The base isolation unit includes second connector 12 being a vibration-source connector to be connected with a structure subjected to seismic vibration, first connector 41 being an isolated-object connector to be connected with an object to be isolated from vibration and located at a predetermined distance in a predetermined base isolation direction from the vibration-source connector, and preloaded spring unit 3 being a movement regulator. The movement regulator includes preloaded springs 8a, 8b that are each an elastic body located between the vibration-source connector and the isolated-object connector. A preload is applied to the elastic body, and an external force in the base isolation direction is applied to the spring. When the external force is equal to or less than the preload, the movement regulator keeps the distance between the first connector and the second connector unchanged. When the external force exceeds the preload, the movement regulator changes the distance by making the vibration-source connector movable.

Thus, when an external seismic force larger than the preload is applied to second connector 12 being the vibration-source connector, second connector 12 can move toward first connector 41 being the isolated-object connector. Accordingly, seismic vibration can be prevented from being transmitted from second connector 12 to first connector 41 and object 1 to be isolated. When an external force such as external vibration in conditions other than earthquake does not exceed the preload, the distance between first connector 41 and second connector 12 is maintained by preloaded spring unit 3. Accordingly, the base isolation unit performing the base isolation function only when an earthquake occurs, and keeping its high stiffness in a normal state can be obtained.

In preloaded spring unit 3, preloaded springs 8a, 8b to which a preload is applied are used. No elements requiring a power source are used in preloaded spring unit 3. The configuration of preloaded spring unit 3 is therefore simpler than devices requiring a power source. It is thus possible to reduce the probability of failure occurrence. During power failure and in environments where a power source is not easily available, the base isolation unit can be applied.

In the base isolation unit, damper 5 and preloaded spring unit 3 are arranged in the base isolation direction and in parallel with each other. In this case, the length of the base isolation unit in the base isolation direction can be made shorter than that of a base isolation unit where they are arranged in series with each other in the base isolation direction. The base isolation unit in the present embodiment can therefore be applied easily to environments where the distance from first connector 41 to second connector 12, or the length of the base isolation unit in the base isolation direction is difficult to be longer than the predetermined value.

The base isolation unit according to the present disclosure is effective particularly when applied to isolate precision instruments, such as telescope and optical instruments. In usual conditions, the base isolation unit according to the present disclosure can be used to connect a structure to house precision instruments such as telescope firmly to the ground in a manner not to influence operation, observation for example, of the precision instruments. When an earthquake occurs, the base isolation unit can be used to isolate the structure from seismic vibration. The base isolation unit can thus prevent transmission of seismic vibration to the precision instruments. When an earthquake occurs, the basic infrastructure such as electricity network is supposed to be damaged and sufficient power cannot be supplied to the base isolation unit. In such a situation, the base isolation unit according to the present disclosure made up of only mechanical elements such as preloaded spring unit 3 can be used all the time regardless of whether electricity, for example, is available or not. As positional displacement adjusting mechanism 13 and rotational displacement adjusting mechanism 14 being a connection position adjuster are included, the object to be isolated is supported without being influenced by counterforce, and therefore, precision instruments with weak stiffness can also be isolated from seismic vibration.

Second Embodiment

<Configuration of Base Isolation Apparatus>

Figure 5:
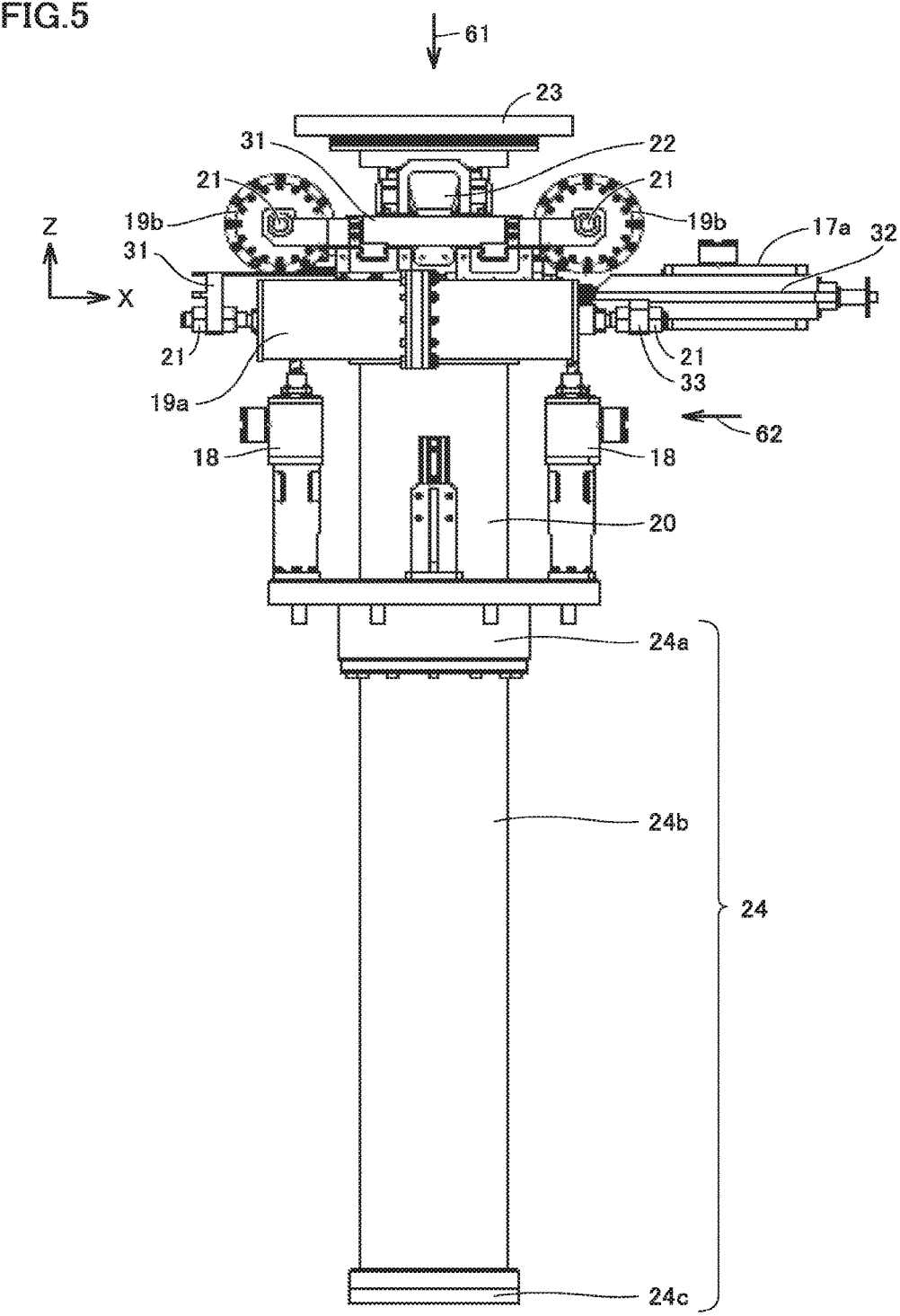
FIG. 5 is a schematic front view of a base isolation apparatus according to a second embodiment of the present disclosure.
Figure 6:
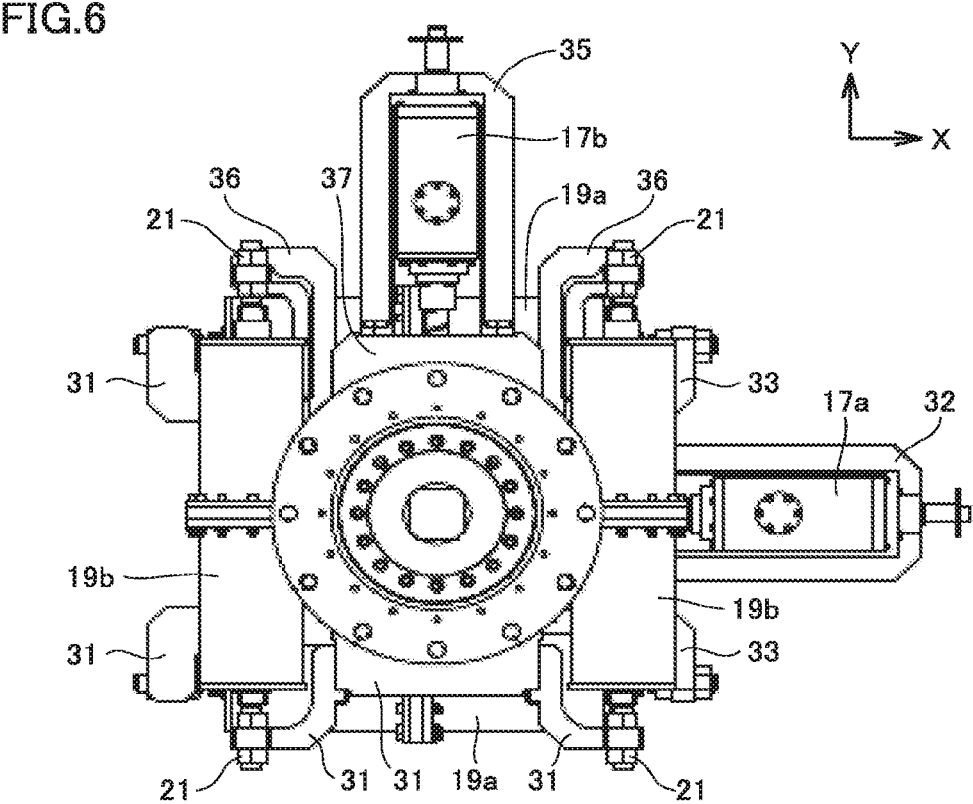
FIG. 6 is a schematic plan view of the base isolation apparatus shown in FIG. 5.
Figure 7:
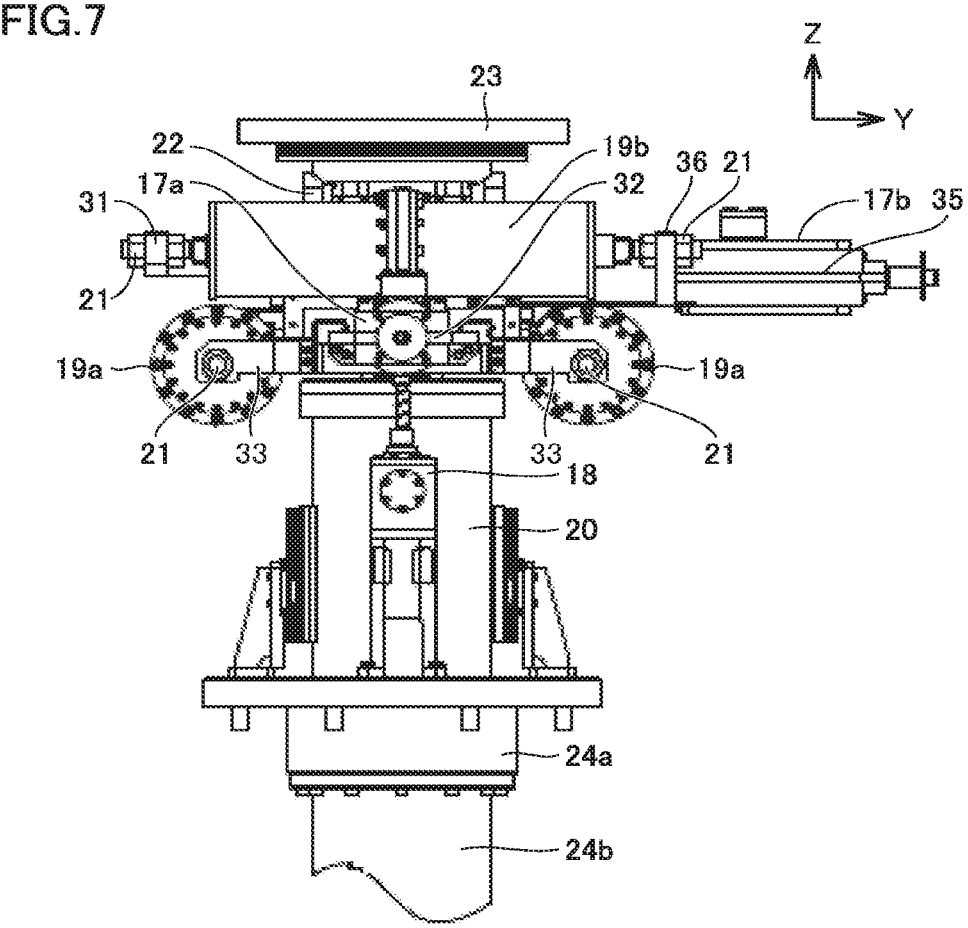
FIG. 7 is a schematic side view of the base isolation apparatus shown in FIG. 5.

Referring to FIGS. 5 to 7, a description is given of a base isolation apparatus according to a second embodiment of the present disclosure. The base isolation apparatus according to the present embodiment may be used for isolation, from vibration, of an observation instrument mounted on a pedestal for a large telescope, for example. As shown in FIGS. 5 to 7, the base isolation apparatus mainly includes a first connector 24 being a vibration-source connector to be connected with a structure subjected to seismic vibration, a second connector 22 including a top plate 23 to be connected with an object to be isolated from vibration, and a Z-direction preloaded spring unit 20, a Z-direction damper 18, an X-direction preloaded spring unit 19a, an X-direction damper 17a, a Y-direction preloaded spring unit 19b, and a Y-direction damper 17b that are arranged between first connector 24 and second connector 22. The object to be isolated such as observation instrument is located on/above top plate 23. The object to be isolated may be in direct contact with top plate 23 or another member may be placed between the object and the top plate. X-direction preloaded spring unit 19a, Y-direction preloaded spring unit 19b, X-direction damper 17a, and Y-direction damper 17b each have one end connected with second connector 22 and the other end connected with a horizontal first connector 30 (not shown). FIG. 6 is a schematic plan view of the base isolation apparatus as seen in the direction indicated by an arrow 61 in FIG. 5, and FIG. 7 is a schematic side view of the base isolation apparatus as seen in the direction indicated by an arrow 62 in FIG. 5. The X direction is one direction in a horizontal plane, the Y direction is orthogonal to the X direction in the horizontal plane, and the Z direction is vertical direction.

At each of four corners of the bottom of the structure, for example, a single base isolation apparatus is installed. Depending on the area of the bottom of the structure, five or more or three or less base isolation apparatuses may be installed under the structure.

Z-direction preloaded spring unit 20, X-direction preloaded spring unit 19a, and Y-direction preloaded spring unit 19b are each basically similar in configuration to preloaded spring unit 3 of the base isolation apparatus in the first embodiment. Z-direction damper 18, X-direction damper 17a, and Y-direction damper 17b are each similar in configuration to damper 5 of the base isolation apparatus in the first embodiment.

First connector 24 includes an upper cylinder 24a having a flange at its upper side, and a lower cylinder 24b having a flange at each of its top and bottom sides and located under and series-connected with upper cylinder 24a. Upper cylinder 24a is connected with and fastened to the structure. To the flange of upper cylinder 24a, one end of Z-direction damper 18 is connected. The bottom end of lower cylinder 24b is closed by a bottom plate 24c. Lower cylinder 24b and bottom plate 24c transmit a force between Z-direction preloaded spring unit 20 and the structure connected with upper cylinder 24a. Z-direction preloaded spring unit 20 has a shaft 7b and one end of shaft 7b is connected with the inner surface of bottom plate 24c located inside the lower cylinder. A lower portion of Z-direction preloaded spring unit 20 is housed in first connector 24, and the length of the lower portion is approximately 70% of the total length of Z-direction preloaded spring unit 20. First connector 24 is installed in a manner to place a portion extending downward from the flange of first connector 24 at a position deeper than a base of the structure.

Second connector 22 includes top plate 23, a positional displacement adjusting mechanism 13 and a rotational displacement adjusting mechanism 14 similar to those in the first embodiment, and a horizontal base isolation unit connector 31 having a composite of rod members and plate members. Horizontal base isolation unit connector 31 is connected with one end of each horizontal X-direction base isolation unit and one end of each horizontal Y-direction base isolation unit. Specifically, horizontal base isolation unit connector 31 is connected with one end of X-direction preloaded spring unit 19a, X-direction damper 17a, Y-direction preloaded spring unit 19b, and Y-direction damper 17b. Horizontal base isolation unit connector 31 is also connected with one end of Z-direction damper 18. Horizontal base isolation unit connector 31 is connected with a supporting part 42 to which one end of shaft 7c of Z-direction preloaded spring unit 20 is also connected, and the positional relation between horizontal base isolation unit connector 31 and supporting part 42 is fixed.

As shown in FIGS. 5 to 7, two X-direction preloaded spring units 19a are arranged in parallel with each other with second connector 22 interposed therebetween for base isolation in the X-axis direction. X-direction preloaded spring unit 19a has its both end portions in the base isolation direction, and a preload-force adjusting mechanism 21 is installed at each of these end portions. Preload-force adjusting mechanism 21 changes the preload by changing the length of shafts 7b, 7c. As shown in FIG. 5, X-direction damper 17a is disposed so that the main-axis direction of X-direction damper 17a is the X-axis direction, as is X-direction preloaded spring unit 19a, and is arranged at a position where the X-direction damper 17a overlaps the central axis of Z-direction preloaded spring unit 20 as seen in the X-axis direction as shown in FIGS. 6 and 7. X-direction damper 17a has an end located on a side far from Z-direction preloaded spring unit 20, and a coupling member 32 bent to surround X-direction damper 17a is located at this end. Coupling member 32 is connected with a coupling member 34 (not shown) with which a coupling member 33 is also connected. Coupling member 33 is connected with one end of X-direction preloaded spring unit 19a on a side where second connector 22 does not exist. Thus, X-direction vibration of horizontal first connector 30 is transmitted similarly to X-direction damper 17a and two X-direction preloaded spring units 19a.

As shown in FIGS. 5 to 7, two Y-direction preloaded spring units 19b are arranged in parallel with each other with second connector 22 interposed therebetween for base isolation in the Y-axis direction. Y-direction preloaded spring unit 19b has its both end portions in the base isolation direction, and preload-force adjusting mechanism 21 is installed at each of these end portions. As shown in FIG. 7, Y-direction damper 17b is disposed so that the main-axis direction of Y-direction damper 17b is the Y-axis direction, as is Y-direction preloaded spring unit 19b, and is arranged at a position where the Y-direction damper 17b overlaps the central axis of Z-direction preloaded spring unit 20 as seen in the Y-axis direction as shown in FIGS. 6 and 7. Y-direction damper 17b has an end located on a side far from Z-direction preloaded spring unit 20, and a coupling member 35 bent to surround Y-direction damper 17b is located at this end. Coupling member 35 is connected with a member 37 with which coupling member 36 is also connected. Coupling member 36 is connected with one end of Y-direction preloaded spring unit 19b, the one end not being the end being second connector 22. Thus, Y-direction vibration of horizontal first connector 30 is transmitted similarly to Y-direction damper 17b and two Y-direction preloaded spring units 19b.

In other words, the base isolation apparatus according to the present embodiment includes a vertical base isolation unit, a first-direction base isolation unit, and a second-direction base isolation unit. Each of the vertical base isolation unit, the first-direction base isolation unit, and the second-direction base isolation unit may have a similar configuration to the base isolation unit disclosed in the first embodiment. The vertical base isolation unit includes at least first connector 24 and Z-direction preloaded spring unit 20. The first-direction base isolation unit includes at least X-direction preloaded spring unit 19a. The second-direction base isolation unit includes at least Y-direction preloaded spring unit 19b. The vertical base isolation unit, the first-direction base isolation unit, and the second-direction base isolation unit include Z-direction damper 18, X-direction damper 17a, and Y-direction damper 17b, respectively. The vertical base isolation unit is an isolation unit to isolate an object to be isolated located above the base isolation unit, from vibration in the vertical direction. The first direction base isolation unit is connected with the object through the vertical base isolation unit and is an isolation unit to isolate the object from vibration in a first direction (X direction) in a horizontal plane. The second-direction base isolation unit is connected with the object through the vertical base isolation unit and is an isolation unit to isolate the object from vibration in a second direction (Y direction) different from the X direction in the horizontal plane. Z-direction preloaded spring unit 20 being a movement regulator of the base isolation unit includes a tensile-side elastic body subjected to a pressure caused by an external force in the direction of increasing the distance (preloaded spring 8a in FIG. 8 for example), and a compressive-side elastic body (preloaded spring 8b in FIG. 8 for example) subjected to a pressure caused by an external force in the direction of decreasing the distance. The vertical base isolation unit includes a preload-force adjusting mechanism 9a being a tensile-side preload adjuster to change the preload applied to preloaded spring 8a, and a preload-force adjusting mechanism 9b being a compressive-side preload adjuster to change the preload applied to preloaded spring 8b. The preload of preloaded spring 8b being a compressive-side elastic body for the vertical base isolation unit is larger than a force in gravity direction for supporting the gravity acting on the object to be isolated.

The first-direction base isolation unit and the second-direction base isolation unit of the base isolation apparatus may each include at least one connection member to be in contact and connected with an object to be connected with the vibration-source connector or the isolated-object connector, and a connection position adjuster capable of adjusting the position and the angle of the connection member with respect to the movement regulator. Specifically, the first-direction base isolation unit and the second-direction base isolation unit may each include positional displacement adjusting mechanism 13 and rotational displacement adjusting mechanism 14 as shown in FIG. 1. The vertical base isolation unit may not include the connection member and the connection position adjuster. When the vertical base isolation unit is long in the main-axis direction as in the second embodiment, preferably the connection member and the connection position adjuster are disposed in the isolated-object connector.

The vertical base isolation unit can be used to achieve isolation from vertical vibration. The first-direction base isolation unit can be used to achieve isolation from vibration in the first direction that is one direction in a horizontal plane. The second base isolation unit can be used to achieve isolation from vibration in the second direction that crosses the first direction in the horizontal plane. In this way, isolation from vibrations in the three directions, i.e., the vertical direction and the directions in the horizontal plane can be achieved.

Two X-direction preloaded spring units 19a are arranged on both sides of Z-direction preloaded spring unit 20, and the two Y-direction preloaded spring units 19b are arranged on both sides of Z-direction preloaded spring unit 20. Accordingly, the dimension in the X direction, the dimension in the Y direction, and the area in the horizontal plane of the base isolation apparatus can be reduced.

<Operation of Base Isolation Apparatus>

Figure 8:
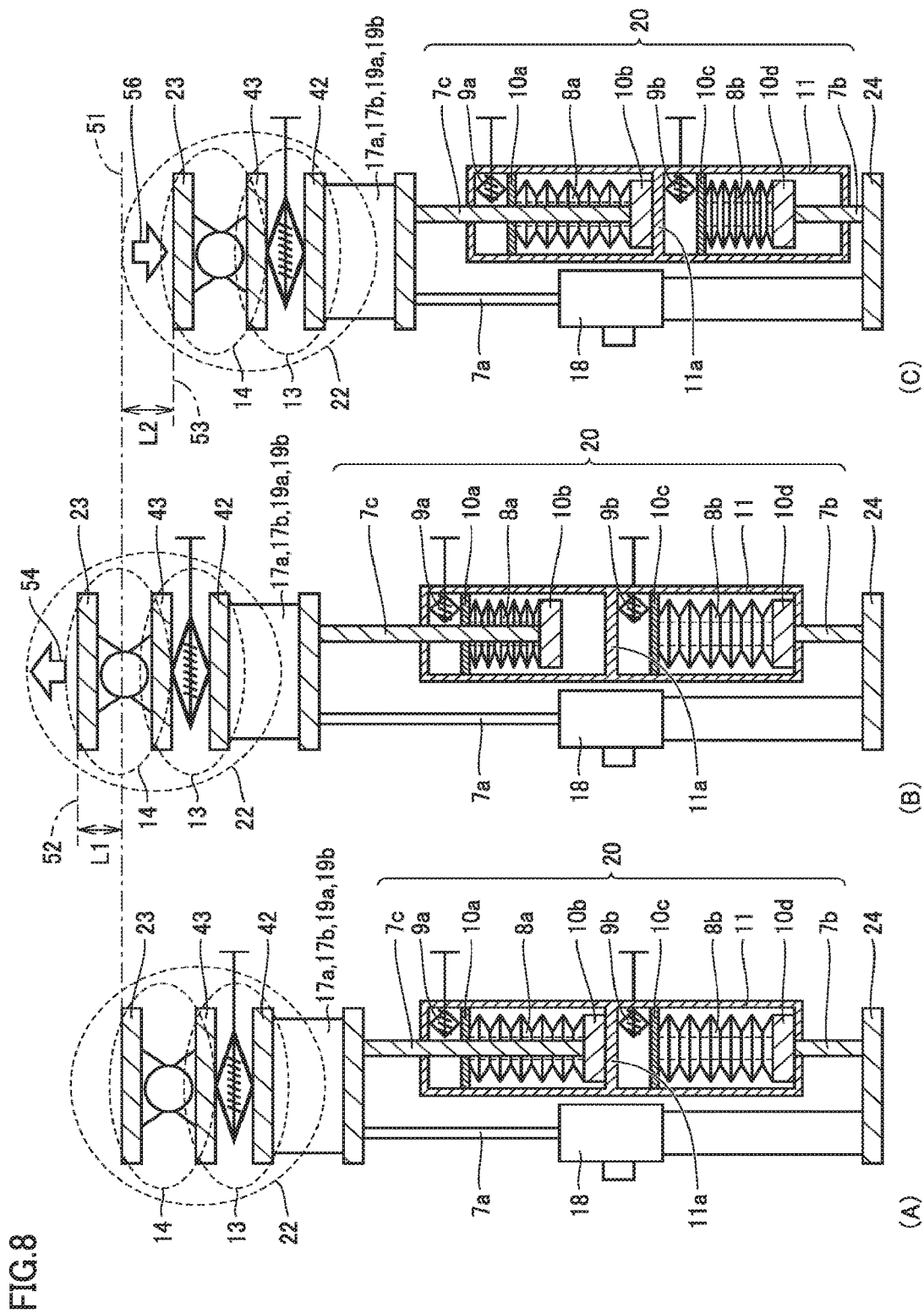
FIG. 8 is a schematic diagram for illustrating an operation, for the Z direction, of the base isolation apparatus shown in FIG. 5.

Referring to FIG. 8, a description is given of an operation of the base isolation apparatus according to the present embodiment. FIG. 8 (A) shows the base isolation apparatus in a normal state before seismic vibration is applied. FIG. 8 (B) shows a state where a tensile stress indicated by an arrow 54 is applied in the base isolation direction, i.e., the vertical direction, to the base isolation apparatus. FIG. 8 (C) shows a state where a compressive stress indicated by an arrow 56 is applied in the base isolation direction to the base isolation apparatus.

The following description is of the operation of the base isolation apparatus subjected to vertical vibration. While first connector 24 shown in FIGS. 5 to 7 is a cylinder having flanges and a bottom, the configuration of the vertical base isolation unit shown in FIG. 8 is a simplified version, like the preloaded spring unit shown in FIG. 3. Although actually X-direction preloaded spring units 19a, Y-direction preloaded spring units 19b, X-direction damper 17a, and Y-direction damper 17b overlap second connector 22 in a vertical region, these units 19a, 19b and dampers 17a, 17b are drawn in FIG. 8 to be located under second connector 22 for simplicity.

Basically operations of X-direction preloaded spring unit 19a, Y-direction preloaded spring unit 19b, X-direction damper 17a, and Y-direction damper 17b when vibration is applied in the X-axis direction/Y-axis direction are similar to the operations of preloaded spring unit 3 and damper 5 in the first embodiment.

As shown in FIG. 8 (B), when an external tensile force is applied in the vertical direction to the base isolation apparatus, pressurizing member 10b connected with shaft 7c presses preloaded spring 8a. Preloaded spring 8a to which a preload is applied is compressively deformed further when the external force exceeds the preload. Accordingly, as is the case shown in FIG. 3 (B), the distance between pressurizing member 10b and movable plate 10a decreases and second connector 22 moves outward by distance L1 relative to the normal state shown in FIG. 8 (A). Distance L1 is a distance between the position of top plate 23 in the normal state indicated by line segment 51 and the position of top plate 23 indicated by line segment 52 in FIG. 8 (B). As second connector 22 thus moves relative to first connector 24, shaft 7a of X-direction damper 18 is pulled toward second connector 22 and a damping force hindering displacement of shaft 7a is generated at Z-axis damper 18.

As shown in FIG. 8 (C), when an external compressive force is applied in the vertical direction to the base isolation apparatus, pressurizing member 10d connected with shaft 7b presses preloaded spring 8b. Preloaded spring 8b to which a preload is applied is compressively deformed further when the external force exceeds the preload. Accordingly, as shown in FIG. 8 (C), the distance from pressurizing member 10d existing on a side where first connector 24 exists to movable plate 10c decreases. Simultaneously, second connector 22 moves vertically downward by distance L2 relative to the normal state shown in FIG. 8 (A). Distance L2 is a distance between the position of top plate 23 in the normal state indicated by line segment 51 and the position of top plate 23 indicated by line segment 51 in FIG. 8 (C). As second connector 22 moves relative to first connector 24 to approach first connector 24, it moves toward Z-direction damper 18. At this time, shaft 7a of Z-direction damper 18 is pressed toward first connector 24 to generate a damping force at Z-direction damper 18 and thereby hinder operation of shaft 7a.

In this way, the vertical base isolation unit operates, when an earthquake occurs, against upthrusting force or a force in the direction of gravity applied to the structure to reduce the input acceleration to or impact against the object to be isolated. After the earthquake, the resilience of preloaded springs 8a, 8b of Z-direction preloaded spring unit 20 causes pressurizing member 10b to return to its initial position before occurrence of the earthquake. The base isolation apparatus thus returns automatically to its normal state. When an external forth equal to or less than the preload force (threshold) is applied to the base isolation apparatus, preloaded springs 8a, 8b are not deformed further, and the base isolation apparatus couples the base with the object to be isolated with high stiffness maintained.

The preload force of preloaded spring 8b to be compressed when an external compressive force is applied as shown in FIG. 8 (C) is set to a value determined by adding a force in gravity direction by preloaded spring 8b for supporting the gravity of the object to be isolated, to an appropriate vertical preload force, in consideration of the influence of the weight of the object to be isolated. In contrast, the preload force of preloaded spring 8a to be compressed when an external tensile force is applied as shown in FIG. 8 (B) is set to a value of an appropriate vertical preload force only. The preload-force adjusting mechanism is used to set the preload force in this way, and accordingly the influence of the weight can be cancelled, and the preloaded spring mounted in the vertical direction is capable of functioning similarly to the preloaded spring mounted in the horizontal direction.

The base isolation apparatus includes not only the base isolation unit in the Z-axis direction but also the base isolation units in the X-axis direction and the Y-axis direction (three-axis directions). The base isolation in all directions is thus achieved.

In the base isolation apparatus, dampers for damping vibration in the X-axis direction and the Y-axis direction in addition to the Z-axis direction and the preloaded spring units are combined appropriately. The base isolation apparatus may include a combination of dampers and preloaded spring units in two directions out of the three directions. The base isolation apparatus may also include a combination of dampers and preloaded spring units in four or more directions, rather than the three directions.

Third Embodiment

<Configuration of Base Isolation Unit>

Figure 9:
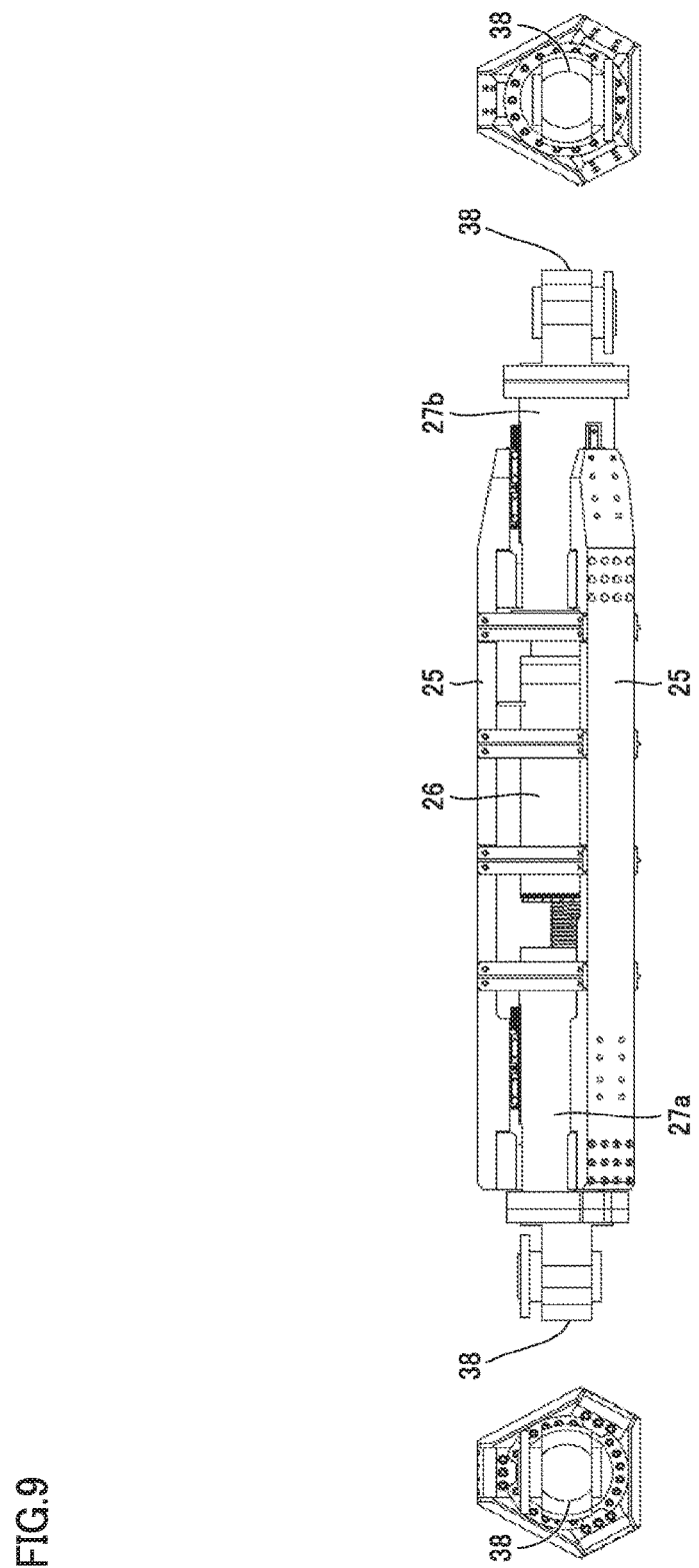
FIG. 9 is a schematic diagram of a base isolation unit according to a third embodiment of the present disclosure.
Figure 10:
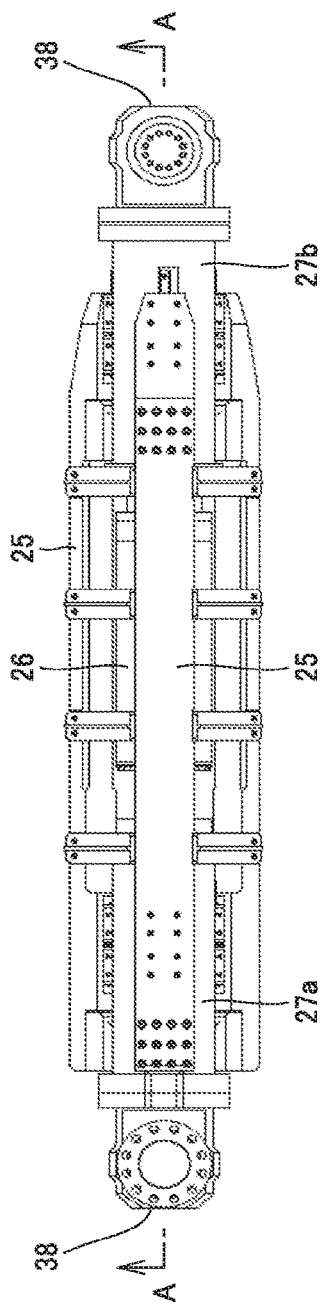
FIG. 10 is a schematic plan view of the base isolation unit shown in FIG. 9.
Figure 11:
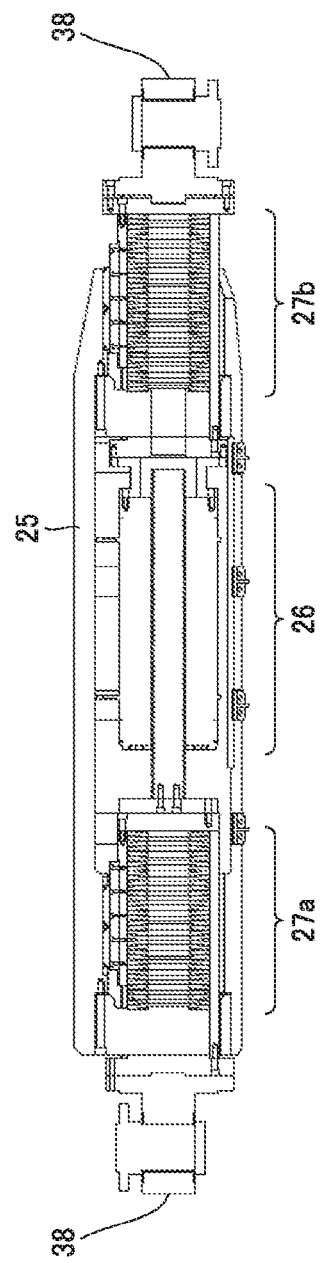
FIG. 11 is a schematic cross-sectional view along line A-A shown in FIG. 10.
Figure 12:
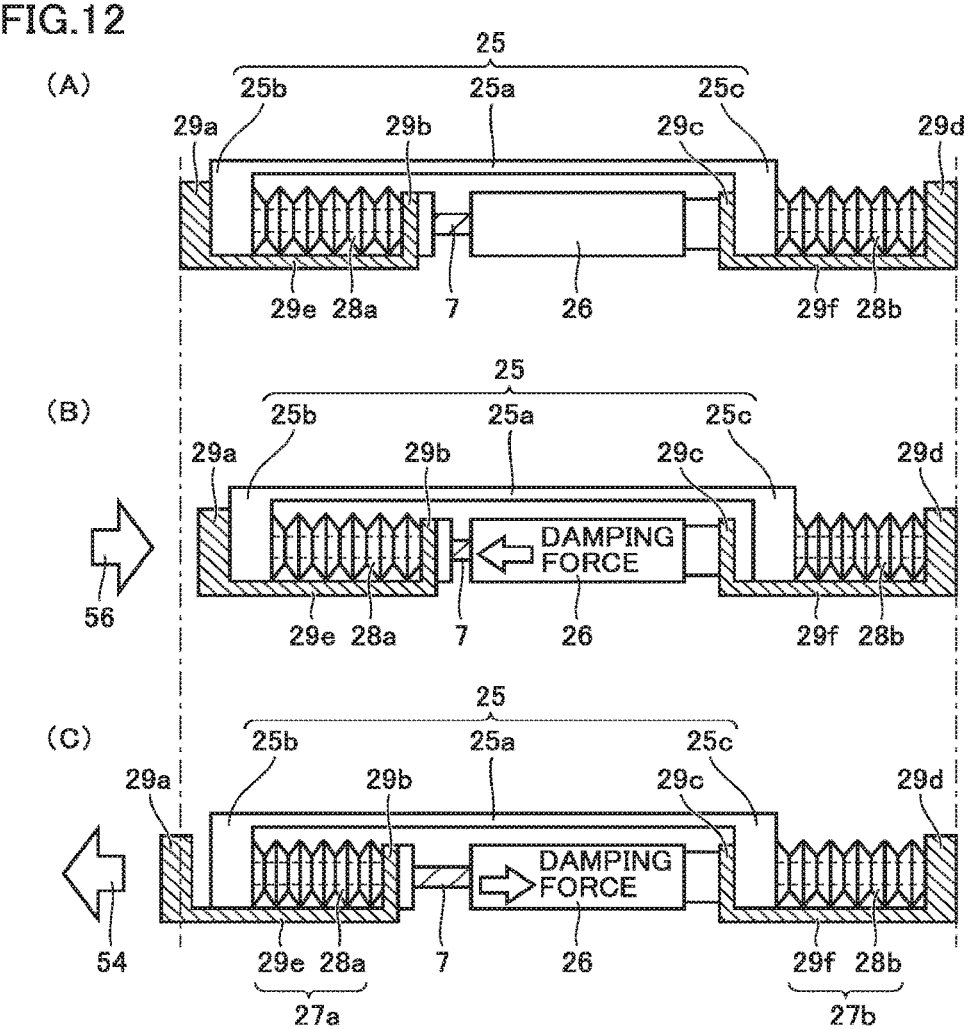
FIG. 12 is a schematic diagram for illustrating an operation of the base isolation unit shown in FIG. 9.

Referring to FIGS. 9 to 12, a base isolation unit according to a third embodiment of the present disclosure is described. The base isolation unit according to the present embodiment is applied between the ground and a pedestal on which a large telescope for example is mounted. FIG. 9 is a schematic diagram of the base isolation unit according to the third embodiment. In a central region of FIG. 9, a schematic front view of the base isolation unit is shown. In the regions on both sides of the front schematic view, side views of the base isolation unit are shown. To each of the both ends of the base isolation unit, a joint 38 corresponding to the first connector or the second connector is connected. FIG. 10 is a schematic plan view of the base isolation unit shown in FIG. 9. FIG. 11 is a schematic cross-sectional view along line A-A shown in FIG. 10. FIG. 12 is a schematic diagram for illustrating an operation and a structure of the base isolation unit shown in FIG. 9.

As shown in FIGS. 9 to 12, basically the base isolation unit has a similar configuration to the base isolation unit shown in FIG. 1 and produces similar effects to those obtained in the base isolation unit in FIG. 1. The base isolation unit differs from the base isolation unit shown in FIG. 1 in the two respects: (i) preloaded spring units 27a, 27b and a damper 26 are arranged linearly in the base isolation direction between a vibration-source connector located at one end of the base isolation unit and an isolated-object connector located at the other end of the base isolation unit; and (ii) the base isolation unit includes a linked pressurizing part 25 for causing preloaded springs 28a, 28b included in preloaded spring units 27a, 27b (see FIG. 12) to operate in a linked manner. The base isolation unit shown in FIGS. 9 to 12 includes preloaded spring 28a that is compressed when an external tensile force is applied to the spring, and preloaded spring 28b that is compressed when an external compressive force is applied to the spring, as shown in FIG. 12. These two preloaded springs are disposed at both sides of damper 26. Details are as follows.

As shown in FIGS. 9 to 12, the base isolation unit includes two preloaded spring units 27a, 27b arranged linearly with damper 26 located between these spring units. Preloaded spring unit 27a includes a casing 29e and preloaded spring 28a disposed in casing 29e, and preloaded spring unit 27b includes a casing 29f and preloaded spring 28b disposed in casing 29f. Linked pressurizing part 25 (see FIG. 12) is disposed to be able to press respective end portions on the same side, left side in FIG. 12 for example, of two preloaded springs 28a, 28b.

Linked pressurizing part 25 includes a spring pressurizing part 25b located in casing 29e, a spring pressurizing part 25c located in casing 29f, and a linking arm 25a to link spring pressurizing part 25b and spring pressurizing part 25c. Spring pressurizing part 25b is located between preloaded spring 28a and an end portion 29a of casing 29e located on a side where damper 26 does not exist. Spring pressurizing part 25c is located between preloaded spring 28b and an end portion 29c of casing 29f located on a side where damper 26 exists. Three protrusions of spring pressurizing parts 25b project from respective openings formed to extend in the axial direction of the associated casing, and three protrusions of spring pressurizing parts 25c project from respective openings formed to extend in the axial direction of the associated casing. Linking arm 25a is three plate members to link the protrusions of spring pressurizing parts 25b, 25c. The three protrusions of each of spring pressurizing parts 25b, 25c are arranged circumferentially at intervals of 120 degrees. The three openings of each of casings 29e, 29f are also arranged circumferentially at intervals of 120 degrees. The circumferential size of each of the three openings of each casing 29e, 29f is constant in the axial direction to allow the three protrusions of each spring pressurizing part 25b, 25c to move axially.

Linking arm 25a transmits a force applied to spring pressurizing part 25b to spring pressurizing part 25c, and transmits a force applied to spring pressurizing part 25c to spring pressurizing part 25b. Linking arm 25a links respective movements of spring pressurizing parts 25b, 25c while keeping a predetermined distance between these spring pressurizing parts.

In other words, the base isolation unit shown in FIGS. 9 to 12 includes a movement regulator to change the distance between the vibration-source connector and the isolated-object connector when an external force exceeding the preload of preloaded springs 28a, 28b is applied. The movement regulator includes casing 29e being a tensile-side casing to house preloaded spring 28a being a tensile-side elastic body, and casing 29f disposed at a side of casing 29e in the base isolation direction, being a compressive-side casing, and to house preloaded spring 28b being a compressive-side elastic body. The movement regulator includes spring pressurizing part 25b being a tensile-force applicator to apply a pressure to preloaded spring 28a. The movement regulator includes spring pressurizing part 25c being a compressive-force applicator to apply a pressure to preloaded spring 28b. The movement regulator includes linking arm 25a being an arm having a predetermined length and to link spring pressurizing part 25b and spring pressurizing part 25c. The base isolation unit includes damper 26 disposed between casing 29e and casing 29f. When the distance between the vibration-source connector and the isolated-object connector increases, damper 26 generates a force in the direction of decreasing the distance. When the distance decreases, damper 26 generates a force in the direction of increasing the distance.

<Operation of Base Isolation Unit>

Referring to FIG. 12, a description is given of an operation of the base isolation unit according to the present embodiment. FIG. 12 (A) shows the base isolation unit in a normal state before seismic vibration is applied. FIG. 12 (B) shows a state where an external compressive force indicated by an arrow 56 is applied in the base isolation direction to the base isolation unit. FIG. 12 (C) shows a state where an external tensile force indicated by an arrow 54 is applied in the base isolation direction to the base isolation unit. As shown in FIG. 12 (A), when the external force is equal to or less than a preload, spring pressurizing part 25b is pressed to end portion 29a by preloaded spring 28a while spring pressurizing part 25c is pressed to end portion 29c by preloaded spring 28b. The length of the base isolation unit in the main-axis direction is therefore the length in the normal state.

As shown in FIG. 12 (B), it is supposed that an external compressive force larger than the preload of preloaded spring 28b is applied to the base isolation unit. End portion 29a presses spring pressurizing part 25b of arm 25 in the direction indicated by arrow 56. At this time, the force applied to spring pressurizing part 25b is transmitted through linking arm 25a to the other spring pressurizing part 25c. Spring pressurizing part 25c being a pressurizing member then presses preloaded spring 28b. Preloaded spring 28b to which the preload is applied is compressively deformed further when the external force exceeds the preload. Accordingly, as shown in FIG. 12 (B), the distance between end portion 29d and spring pressurizing part 25c existing on a side where end portion 29c exists decreases, and spring unit 27a and linked pressurizing part 25 move toward spring unit 27b. When the external compressive force is equal to or less than the preload of preloaded spring 28b, preloaded spring 28b is not compressively deformed further. Spring unit 27a and linked pressurizing part 25 do not move and the distance between end portion 29a and end portion 29d remains the same as the length in the normal state.

As spring unit 27a moves toward spring unit 27b, damper 26 between spring unit 27a and spring unit 27b generates a damping force indicated by the outlined arrow in the direction of acting against movement of spring unit 27a.

As shown in FIG. 12 (C), it is supposed that an external tensile force larger than the preload of preloaded spring 28a is applied to the base isolation unit. Spring unit 27a moves leftward in FIG. 12 and the distance between end portion 29a and end portion 29d increases. Because spring pressurizing part 25c of linked pressurizing part 25 engages with end portion 29c, linked pressurizing part 25 is not moved. Preloaded spring 28a is therefore further compressively deformed. When the external tensile force is equal to or less than the preload of preloaded spring 28a, preloaded spring 28a is not compressively deformed further. Spring unit 27a therefore remains stationary and the distance between end portion 29a and end portion 29d remains the same as the length in the normal state.

When spring unit 27a moves in the direction away from spring unit 27b, damper 26 between spring unit 27a and spring unit 27b generates a damping force indicated by the outlined arrow in FIG. 12 in the direction of acting against movement of spring unit 27a.

Under disturbance such as ordinary wind, the base isolation unit forming a part of the structure keeps stiffness as shown in FIG. 12 (A). Under seismic vibration, damper 26 acts to enable seismic vibration energy to be absorbed as shown in FIG. 12 (B) and FIG. 12 (C).

<Advantages of Base Isolation Unit>

In the base isolation unit, damper 26 and preloaded spring units 27a, 27b are arranged in series with each other in the base isolation direction. In this case, the base isolation unit can be reduced in width perpendicular to the base isolation direction, as compared with the arrangement where damper 26 is arranged in parallel with preloaded spring units 27a, 27b as shown in FIG. 1 for example. The base isolation unit in the present embodiment can therefore be applied easily to an environment where the width perpendicular to the base isolation direction is restricted not to be so broad.

Since preloaded spring units 27a, 27b and damper 26 are arranged linearly, a force or moment resultant from positional displacement of preloaded spring units 27a, 27b and damper 26 with respect to one another can be suppressed. Further, more than one base isolation unit shown in FIGS. 9 to 12 can be prepared and assembled into a single base isolation system. The base isolation units can therefore be transported individually while installation and assembly of the base isolation units into a base isolation system are easy.

Fourth Embodiment

<Configuration and Operation of Base Isolation Unit>

Figure 13:
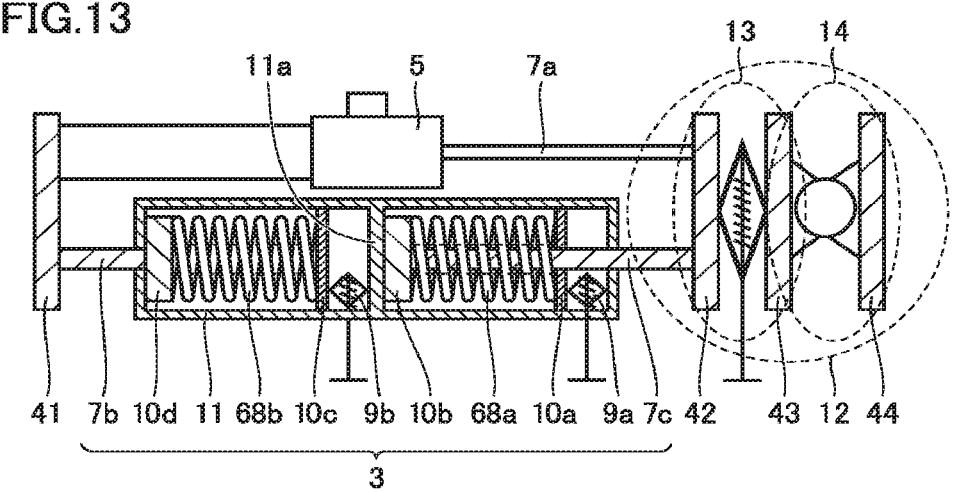
FIG. 13 is a schematic diagram of a base isolation unit according to a fourth embodiment of the present disclosure.

Referring to FIG. 13, a description is given of a base isolation unit according to a fourth embodiment of the present disclosure. FIG. 13 is a schematic diagram of the base isolation unit and corresponds to FIG. 1 for the first embodiment. Basically the base isolation unit shown in FIG. 13 has a similar configuration to the base isolation unit shown in FIG. 1 and produces similar effects to those obtained in the base isolation unit in FIG. 1. The base isolation unit in FIG. 13 differs from the base isolation unit in FIG. 1 in that the elastic body as a component of preloaded spring unit 3 is a coil spring 68 instead of disc springs. Use of such a coil spring 68 also enables the base isolation unit to operate similarly to the base isolation unit shown in FIG. 1.

<Advantages of Base Isolation Unit>

Basically the base isolation unit produces similar effects to those obtained in the base isolation unit shown in FIG. 1. As to the elastic body as a component of preloaded spring unit 3, any spring of a different type such as leaf spring or wire spring for example may be used instead of coil spring 68. Effects obtained by use of such a spring of a different type are also similar to those obtained in use of coil spring 68.

Fifth Embodiment

<Configuration and Operation of Base Isolation Unit>

Figure 14:
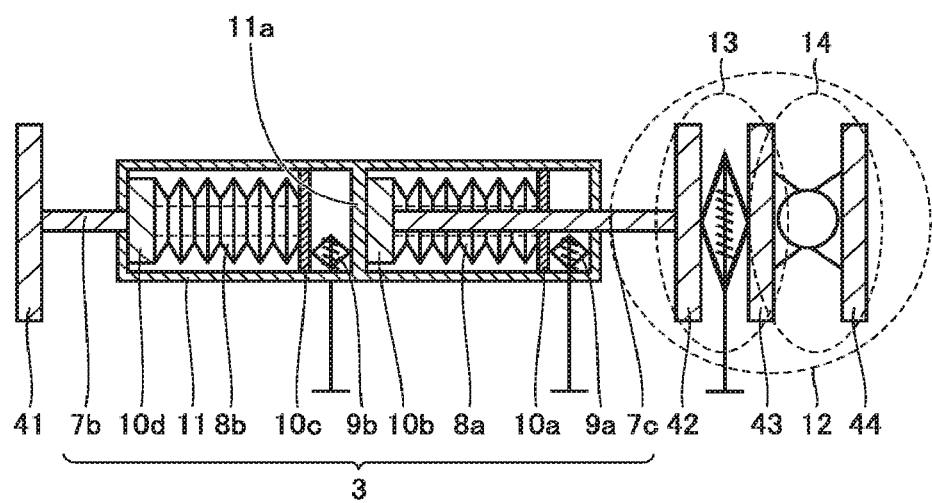
FIG. 14 is a schematic diagram of a base isolation unit according to a fifth embodiment of the present disclosure.

Referring to FIG. 14, a description is given of a base isolation unit according to a fifth embodiment of the present disclosure. FIG. 14 is a schematic diagram of the base isolation unit and corresponds to FIG. 1 for the first embodiment. As shown in FIG. 14, basically the base isolation unit has a similar configuration to the base isolation unit shown in FIG. 1 and produces similar effects to those obtained in the base isolation unit in FIG. 1. The base isolation unit in FIG. 14 differs from the base isolation unit in FIG. 1 in that the former does not include damper 5. The base isolation unit having such a configuration can operate similarly to the base isolation unit shown in FIG. 1.

<Advantages of Base Isolation Unit>

Basically the base isolation unit produces similar effects to those obtained in the base isolation unit shown in FIG. 1. Because the damper is not provided, the base isolation unit shown in FIG. 14 achieves ideal base isolation and minimizes acceleration applied to an object to be isolated. Meanwhile, the variation in distance between first connector 41 and second connector 12, specifically the distance between the object to be isolated and the structure shaken together with the ground, increases. The base isolation unit shown in FIG. 14 can be applied to the case where such a large variation is acceptable. If the distance between first connector 41 and second connector 12 is smaller, the structure may hit the object to be isolated. In view of this, the distance between first connector 41 and second connector 12 is set larger enough than a supposed range of variation of the distance.

In each embodiment, the disclosed base isolation unit has the preloaded spring unit including two elastic bodies. The number of elastic bodies included in the preloaded spring unit is not limited to two, but may be one. Alternatively, the number of elastic bodies included in the preloaded spring unit may be three or more.

It should be construed that the embodiments disclosed herein are given by way of illustration in all respects, not by way of limitation. It is intended that the scope of the present disclosure is defined by claims, not by the description above, and encompasses all variations equivalent in meaning and scope to the claims. For the present disclosure, the embodiments can be combined freely or modification or omission of each embodiment can be made within the scope of the spirit of the present disclosure.

INDUSTRIAL APPLICABILITY

The present disclosure is applied particularly advantageously to a base isolation system for precision instruments.

REFERENCE SIGNS LIST 1 object to be isolated; 2 layer to be isolated; 2a, 4a wall; 3, 27a, 27b preloaded spring unit; 4 base; 5, 26 damper; 6 linear guide; 7, 7a-7c shaft; 8a, 8b, 28a, 28b preloaded spring; 9a, 9b, 21 preload-force adjusting mechanism; 10a, 10c movable plate; 10b, 10d pressurizing member; 11, 29e, 29f casing; 11a partition wall; 12, 22 second connector; 13 positional displacement adjusting mechanism; 14 rotational displacement adjusting mechanism; 15, 16 region; 17a X-direction damper; 17b Y-direction damper; 18 Z-direction damper; 19a X-direction preloaded spring unit; 19b Y-direction preloaded spring unit; 20 Z-direction preloaded spring unit; 23 top plate; 24, 41 first connector; 24a upper cylinder; 24b lower cylinder; 24c bottom plate; 25 arm; 25a linking arm; 25b, 25c spring pressurizing part; 29a-29d end portion; 30 horizontal first connector; 31 horizontal base isolation unit connector; 32, 33, 34, 35, 36, 37 coupling member; 38 joint; 42 supporting part; 43 intermediate plate; 44 connector; 51-53 line segment; 54-57, 61, 62 arrow; 68 coil spring

The invention claimed is:

1. A base isolation unit comprising:
   a vibration-source connector connected with a structure subjected to seismic vibration;
   an isolated-object connector connected with an object to be isolated from seismic vibration, and located at a distance from the vibration-source connector in a base isolation direction, the distance in a normal state being predetermined; and
   a movement regulator located between the vibration-source connector and the isolated-object connector, the movement regulator including an elastic body being applied with a preload and being subjected to a pressure caused by an external force in the base isolation direction, the movement regulator being configured to keep the distance in the normal state unchanged when the external force is equal to or less than the preload, and to change the distance by making the vibration-source connector movable when the external force is larger than the preload.

2. The base isolation unit according to claim 1, wherein the elastic body included in the movement regulator includes:
   a tensile-side elastic body subjected to a pressure caused by the external force in a direction of increasing the distance; and
   a compressive-side elastic body subjected to a pressure caused by the external force in a direction of decreasing the distance.

3. The base isolation unit according to claim 1, further comprising a preload adjuster to change the preload applied to the elastic body.

4. The base isolation unit according to claim 2, further comprising:
a tensile-side preload adjuster to change the preload applied to the tensile-side elastic body; and
a compressive-side preload adjuster to change the preload applied to the compressive-side elastic body.

5. The base isolation unit according to claim 2, wherein the movement regulator includes:
a tensile-side casing to house the tensile-side elastic body and having an opening sized not to allow the tensile-side elastic body to get out of the tensile-side casing, the opening being located at an end of the tensile-side casing in the base isolation direction;
a compressive-side casing located on a side of the tensile-side casing where the opening of the tensile-side casing does not exist, the compressive-side casing to house the compressive-side elastic body and having an opening sized not to allow the compressive-side elastic body to get out of the compressive-side casing, the opening being located at an end of the compressive-side casing on a side where the tensile-side casing does not exist in the base isolation direction;
a tensile-side shaft extending through the opening of the tensile-side casing;
a tensile-force applicator being in contact with an end of the tensile-side elastic body, the end being located on a side far from the opening of the tensile-side casing in the base isolation direction, the tensile-force applicator being connected with the tensile-side shaft to transmit a force as a pressure from the tensile-side shaft to the tensile-side elastic body;
a compressive-side shaft extending through the opening of the compressive-side casing; and
a compressive-force applicator being in contact with an end of the compressive-side elastic body, the end being located on a side near the opening of the compressive-side casing in the base isolation direction, the compressive-force applicator being connected with the compressive-side shaft to transmit a force as a pressure from the compressive-side shaft to the compressive-side elastic body.

6. The base isolation unit according to claim 1, further comprising a vibration damper
to generate a force in a direction of decreasing the distance between the vibration-source connector and the isolated-object connector when the distance increases, and
to generate a force in a direction of increasing the distance when the distance decreases.

7. The base isolation unit according to claim 1, wherein the vibration damper and the movement regulator in the base isolation direction are arranged in parallel with each other.

8. The base isolation unit according to claim 1, wherein the vibration damper and the movement regulator in the base isolation direction are arranged in series with each other.

9. The base isolation unit according to claim 2, wherein the movement regulator includes:
a tensile-side casing to house the tensile-side elastic body;
a compressive-side casing disposed at a side of the tensile-side casing in the base isolation direction and to house the compressive-side elastic body;
a vibration damper disposed between the tensile-side casing and the compressive-side casing
to generate a force in a direction of decreasing the distance between the vibration-source connector and the isolated-object connector when the distance increases, and
to generate a force in a direction of increasing the distance when the distance decreases;
a tensile-force applicator located between the tensile-side elastic body and an end of the tensile-side casing on a side where the vibration damper does not exist, to apply a pressure to the tensile-side elastic body;
a compressive-force applicator located between the compressive-side elastic body and an end of the compressive-side casing on a side where the vibration damper exists, to apply a pressure to the compressive-side elastic body; and
an arm having a predetermined length and to link the tensile-force applicator and the compressive-force applicator.

10. The base isolation unit according to claim 1, wherein at least one of the vibration-source connector and the isolated-object connector includes:
a connection member being in contact and connected with an object connected with the vibration-source connector or the isolated-object connector; and
a connection position adjuster capable of adjusting a position and an angle of the connection member with respect to the movement regulator.

11. A base isolation apparatus comprising:
a vertical base isolation unit being the base isolation unit according to claim 1, and to isolate the object located above the vertical base isolation unit from seismic vibration in vertical direction being the base isolation direction of the vertical base isolation unit;
a first-direction base isolation unit being the base isolation unit according to claim 1, connected with the object through the vertical base isolation unit, and to isolate the object from seismic vibration in a first direction in a horizontal plane, the first direction being the base isolation direction of the first-direction base isolation unit; and
a second-direction base isolation unit being the base isolation unit according to claim 1, connected with the object through the vertical base isolation unit, and to isolate the object from seismic vibration in a second direction different from the first direction in the horizontal plane, the second direction being the base isolation direction of the second-direction base isolation unit,
the elastic body included in the movement regulator of the vertical base isolation unit including:
a tensile-side elastic body subjected to a pressure caused by the external force in a direction of increasing the distance; and
a compressive-side elastic body subjected to a pressure caused by the external force in a direction of decreasing the distance, and
the vertical base isolation unit including:
a tensile-side preload adjuster to change the preload applied to the tensile-side elastic body; and
a compressive-side preload adjuster to change the preload applied to the compressive-side elastic body,
the preload of the compressive-side elastic body included in the vertical base isolation unit being larger than a force in gravity direction for supporting gravity acting on the object to be isolated.

12. The base isolation apparatus according to claim 11, wherein
the vibration-source connector included in each of the vertical base isolation unit, the first-direction base isolation unit, and the second-direction base isolation unit includes:
a connection member being in contact and connected with an object connected with the vibration-source connector; and
a connection position adjuster capable of adjusting a position and an angle of the connection member with respect to the movement regulator.

13. The base isolation apparatus according to claim 11, wherein
the vertical base isolation unit, the first-direction base isolation unit, and the second-direction base isolation unit each include a vibration damper
to generate a force in a direction of decreasing the distance between the vibration-source connector and the isolated-object connector when the distance increases, and
to generate a force in a direction of increasing the distance when the distance decreases.

14. A base isolation apparatus comprising:
a first-direction base isolation unit being the base isolation unit according to claim 1, connected with the object supported movably in a horizontal plane, and to isolate the object from seismic vibration in a first direction in the horizontal plane, the first direction being the base isolation direction of the first-direction base isolation unit; and
a second-direction base isolation unit being the base isolation unit according to claim 1, connected with the object, and to isolate the object from seismic vibration in a second direction different from the first direction in the horizontal plane, the second direction being the base isolation direction of the second-direction base isolation unit.

\* \* \* \* \*